United States Patent
Hu et al.

(10) Patent No.: US 10,409,104 B2
(45) Date of Patent: Sep. 10, 2019

(54) DISPLAY SUBSTRATE AND DISPLAY DEVICE

(71) Applicant: Boe Technology Group Co., Ltd., Beijing (CN)

(72) Inventors: Yong Hu, Beijing (CN); Xinyin Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 151 days.

(21) Appl. No.: 15/500,987

(22) PCT Filed: May 20, 2016

(86) PCT No.: PCT/CN2016/082759
§ 371 (c)(1),
(2) Date: Feb. 1, 2017

(87) PCT Pub. No.: WO2017/156861
PCT Pub. Date: Sep. 21, 2017

(65) Prior Publication Data
US 2018/0180934 A1      Jun. 28, 2018

(30) Foreign Application Priority Data
Mar. 17, 2016   (CN) .................... 2016 2 0208019 U

(51) Int. Cl.
*G02F 1/13* (2006.01)
*G02F 1/1335* (2006.01)
(Continued)

(52) U.S. Cl.
CPC .... *G02F 1/133514* (2013.01); *G02F 1/13394* (2013.01); *G02F 1/133305* (2013.01); *G02F 2001/13396* (2013.01)

(58) Field of Classification Search
CPC ............. G02F 1/133514; G02F 1/1333; G02F 1/133305; G02F 1/1339; G02F 1/13394; G02F 2001/13396
(Continued)

(56) References Cited

U.S. PATENT DOCUMENTS

2007/0182888 A1   8/2007   Inoue et al.
2010/0002172 A1   1/2010   Kim et al.
(Continued)

FOREIGN PATENT DOCUMENTS

| CN | 1493901 | 5/2004 |
|---|---|---|
| CN | 101587200 | 11/2009 |
| CN | 102047153 | 5/2011 |

OTHER PUBLICATIONS

International Search Report for PCT/CN2016/082759 dated Oct. 20, 2016.

*Primary Examiner* — Wen Huang
(74) *Attorney, Agent, or Firm* — Calfee, Halter & Griswold LLP

(57) ABSTRACT

The disclosure provides a display substrate and a display device. The display substrate comprises a base, multiple color filters, and multiple spacers formed on the base; at a position corresponding to at least one spacer, at least one of two adjacent color filters has a bending part at an adjacent border close to the other color filter; wherein at least one bending part is a protrusion adapted to cause the spacer to be located inside the border of a corresponding color filter, and projection of the bottom surface of the spacer on the side close to the base on the base does not overlap projection of any of the borders of the two adjacent color filters on the base. The borders of the two color filters are not under the spacer, such that the region corresponding to the spacer is flat, which is conducive to stably arranging the spacer.

14 Claims, 4 Drawing Sheets

(51) Int. Cl.
*G02F 1/1333* (2006.01)
*G02F 1/1339* (2006.01)

(58) Field of Classification Search
USPC .......................................................... 359/891
See application file for complete search history.

(56) References Cited

U.S. PATENT DOCUMENTS

2014/0049717 A1  2/2014 Kwak et al.
2016/0033814 A1* 2/2016 Na ................... G02F 1/133305
                                                 349/106

\* cited by examiner

DISPLAY SUBSTRATE AND DISPLAY DEVICE

RELATED APPLICATIONS

The present application is the U.S. national phase entry of PCT/CN2016/082759, with an international filing date of May 20, 2016, which claims the benefit of Chinese Patent Application No. 201620208019.X filed on Mar. 17, 2016, the entire disclosures of which are incorporated herein by reference.

TECHNICAL FIELD

The present disclosure relates to the field of display technologies, and in particular, to a display substrate and a display device.

BACKGROUND

A liquid crystal display device generally comprises an array substrate and a color film substrate, which are cassette-to-cassette packaged and are kept at a distance by a spacer. Therein, the array substrate is used for implementing the control of luminous brightness, and the color film substrate generally comprises a base and a color filter formed on the base. By the filtering effect of the color filter, light of a different color may be generated, thereby achieving the display of multiple colors. In general, color filters of different colors will be arranged separately, and one of two adjacent color filters will be stacked above the other. Since an individual color filter has a certain layer thickness itself, such that the upper surface of the color substrate is not flat enough at a position of lamination, this is not conducive to arrange a spacer steadily at the corresponding position.

SUMMARY

In a first aspect, an embodiment of the present disclosure provides a display substrate comprising: a base and multiple color filters and spacers formed on the base. At a position corresponding to at least one spacer, at least one of two adjacent color filters has a bending part at an adjacent border close to the other color filter; wherein at least one bending part is a protrusion adapted to cause a spacer to be located inside the border of a corresponding color filter as a whole, and projection of the bottom surface of the spacer on the side close to the base on the base does not overlap projection of any of the borders of the two adjacent color filters on the base.

In certain exemplary embodiments, the spacer is at least partially located inside the bending part which is the protrusion.

In certain exemplary embodiments, each of the two adjacent color filters has the bending part at an adjacent border close to the other color filter; the bending part corresponding to each of the color filters is a protrusion and overlaps the other, and the projection of the bottom surface of the corresponding spacer on the side close to the base on the base is inside a border of a projection of the overlapping part of the two adjacent color filters on the base.

In certain exemplary embodiments, each of the two color filters has the bending part at an adjacent border close to the other color filter; the bending part corresponding to one of the color filters is the protrusion; and the bending part corresponding to the other color filter is a recess.

In certain exemplary embodiments, a first color filter in the two color filters has the bending part at an adjacent border close to a second color filter, and the bending part is the protrusion; the second color filter does not have the bending part at an adjacent border close to the first color filter; and the first color filter is any one of the two color filters, and the second color filter is the other one of the two color filters.

In certain exemplary embodiments, the two adjacent color filters overlap at a position of the bending part, and projection of the bottom surface of the spacer on the side close to the base on the base is outside a border of the projection of overlapping part of the two adjacent color filters on the base.

In certain exemplary embodiments, the two adjacent color filters do not overlap at a position of the bending part.

In certain exemplary embodiments, the outline of the bending part is an arc, a polyline, and alternatively a combination of an arc and a polyline.

In certain exemplary embodiments, one part of the corresponding spacer is located on the protrusion, and the other part is located on body part of a color filter which the protrusion belongs to.

In certain exemplary embodiments, the spacer is a primary spacer and alternatively an auxiliary spacer, and a shape of an outline of the bending part is the same as that of an outline of a surface of the spacer facing a color filter at a position of the bending part.

In certain exemplary embodiments, at a position of the same row of pixels, shapes of borders of the individual color filters on a first side are the same; and shapes of borders on a second side are also the same; shapes of borders of the same column of the color filters on the first side at a position of individual rows of pixels are the same, and shapes of borders on the second side at a position of individual rows of pixels are the same.

In a second aspect, an embodiment of the present disclosure provides a display device comprising a display substrate as described in any of the above examples.

DETAILED DESCRIPTION

In the following specific implementations of the present disclosure will be further described in connection with the drawings and embodiments. The following embodiments are just used for more clearly illustrating the technical solution of the present disclosure, but not for limiting the protection scope of the invention.

An embodiment of the present disclosure provides a display substrate, the display substrate comprising a base and multiple color filters and spaces formed on the base; at a position corresponding to at least one spacer, at least one of two adjacent color filters having a bending part at an adjacent border close to the other color filter; wherein at least one bending part is a protrusion adapted to cause a spacer to be located inside the border of a corresponding color filter as a whole, and projection of the bottom surface of the spacer on the side close to the base on the base does not overlap projection of any of borders of the two adjacent color filters on the base.

In the display substrate provided by the embodiments of the present disclosure, the borders of two adjacent color filters are not under the spacer, such that the region corresponding to the spacer is flat as a whole, which is conducive to stable arrangement of the spacer.

When implemented specifically, the border here may in particular refer to a border in the column direction, and the column direction here is consistent with the understanding in the prior art, that is, after the display substrate is applied in a corresponding display device, the direction perpendicular to the extending direction of a grid line of the display device, namely, the direction in which a data line extends.

In a practical application, a specific structure of the corresponding display substrate may appear in many different forms. For example, the bending part may mean that the corresponding color filter has a protrusion, such that a border of the color filter has a bending part, and alternatively also may mean that the corresponding color filter has a recess, such that a border of the color filter has a bending part. As another example, when the corresponding display device comprises a main spacer and an auxiliary spacer, "at a position corresponding to a spacer" may refer to at a position corresponding to a main spacer, and alternatively at a position corresponding to an auxiliary spacer. As another example, when implemented specifically, two adjacent color filters may have an overlap in the column direction and alternatively also may not have an overlap in the column direction at the position of a spacer. In the following, some scenarios therein will be described in detail in connection with the drawings.

Embodiment One

Figure 1:
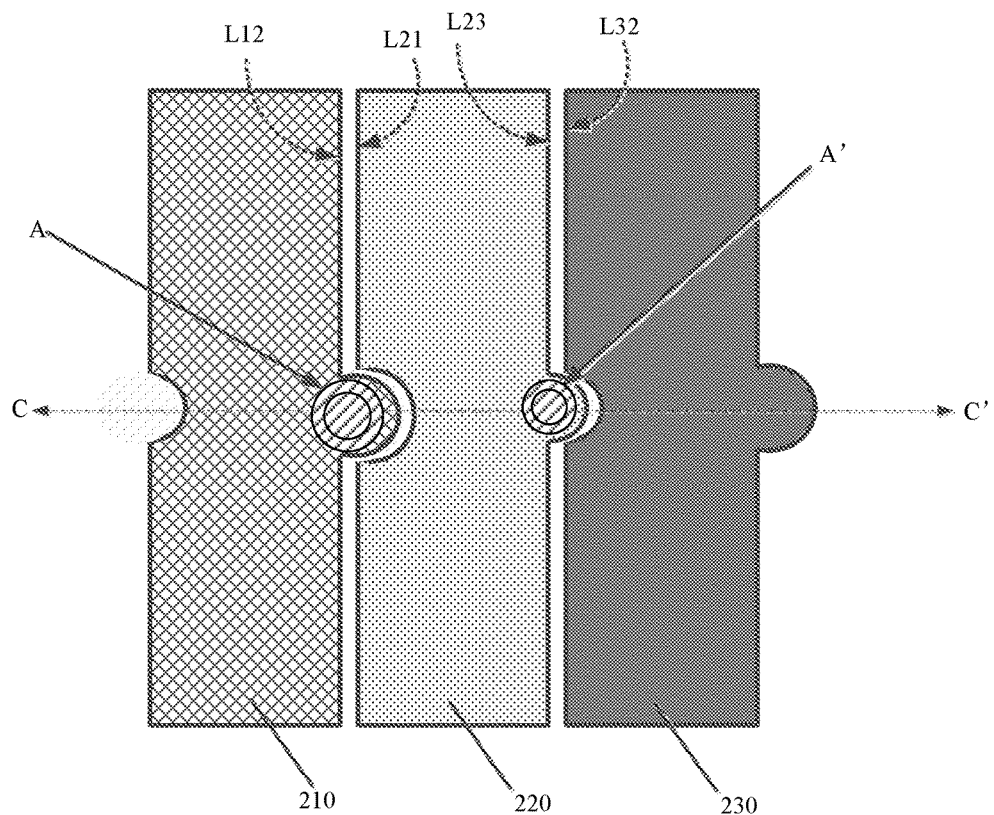
FIG. 1 is a schematic top view of a display substrate provided by Embodiment One of the disclosure.
Figure 2:
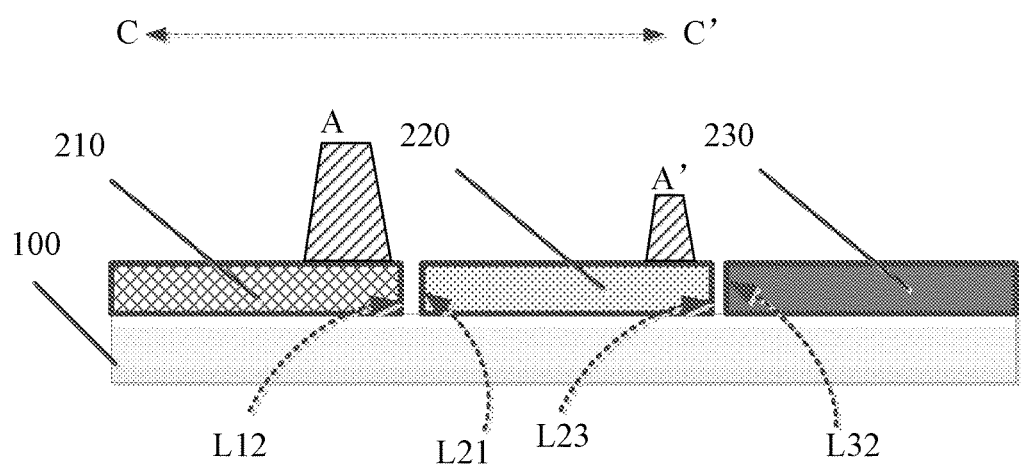
FIG. 2 is a schematic longitudinal section view of the display substrate provided by Embodiment One of the disclosure.

Reference may be made to FIG. 1 and FIG. 2 for the structure of a display substrate provided by Embodiment One of the disclosure, which comprises a base 100 and a color filter 210, a color filter 220, a color filter 230, a primary spacer A and an auxiliary spacer A' formed on the base 100, the color of the color filter 210, the color of the color filter 220 and the color of the color filter 230 being different; wherein the primary spacer A is arranged at a position where the color filter 210 borders the color filter 220, and the auxiliary spacer A' is arranged at a position where the color filter 220 borders the color filter 230.

At a position of the primary spacer A, the color filter 210 has a protrusion toward the right side, such that a border L12 of the color filter 210 in the column direction has a rightward bending part, and the bending part may cause the corresponding primary spacer A to be located inside the border of the color filter 210 as a whole; in addition, at the position of the primary spacer A, the color filter 220 has a recess toward the right side, such that a border L21 of the color filter 220 in the column direction also has a rightward bending part, which may cause the corresponding primary spacer A to be able to be located outside the border of the color filter 220 as a whole. And the color filter 210 and the color filter 220 have no overlap at the positions of the bending parts.

Thus, with reference to FIG. 2, under the primary spacer A is only arranged a color filter 210, and the color filter 210 overspreads the region under the primary spacer A, such that the whole spacer A is arranged on a flat surface, which contributes to the stability of the primary spacer A.

Likewise, at a position of the auxiliary spacer A', the color filter 220 has a protrusion toward the right side, such that a border L23 of the color filter 220 in the column direction has a rightward bending part, and the bending part may cause the corresponding auxiliary spacer A' to be located inside the border of the color filter 220 as a whole; and at the position of the auxiliary spacer A', the color filter 230 has a recess toward the right side, such that a border L32 of the color filter 230 in the column direction also has a rightward bending part, which may cause the corresponding auxiliary spacer A' to be able to be located outside the border of the color filter 230 as a whole. In other region, the color filter 220 and the color filter 230 also have no overlap. Since the size of the auxiliary spacer A' is less than the size of the primary spacer A, the sizes of the bending part in the border L23 and the bending part in the border L32 are less than those of the bending part in the border L12 and the bending part in the border L21.

Thus, with reference to FIG. 2, at the position corresponding to the auxiliary spacer A', on a surface of the display substrate facing the auxiliary spacer A' is only arranged a color filter 220, and material of the color filter 220 overspreads the region under the whole auxiliary spacer A', such that the whole auxiliary spacer A' is arranged on a flat surface, which contributes to the stability of the auxiliary spacer A'.

With reference to FIG. 1 and FIG. 2, in this embodiment, the shape of an individual bending part is a semicircular arc, and is identical to the outline of the bottom surface of a spacer (i.e., a surface facing a color filter when arranged on the color filter) at the bending part, which may thus reduce the size of the bending part as much as possible and facilitate the design and layout of the color filter. Of course, when implemented specifically, a bending part herein may also be a square consisting of multiple polylines. In addition, when implemented specifically, an outline of an individual bending part may also be of another shape, for example, a combination of polylines and arcs.

With reference to FIG. 1 and FIG. 2, in this embodiment, one part of a spacer is located on the protrusion, and the other part is located on body part of a corresponding color filter. In this way, the size of a bending part may also be reduced, and the design and layout of the color filter at the position of the bending part is facilitated.

Embodiment Two

Figure 3:
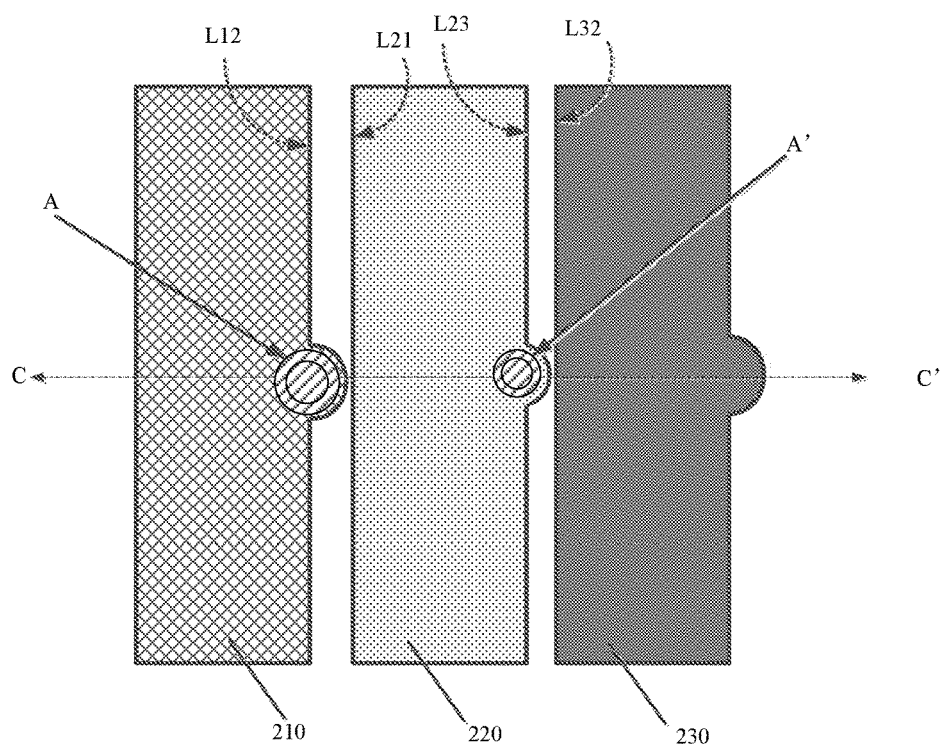
FIG. 3 is a schematic top view of a display substrate provided by Embodiment Two of the disclosure.

Reference may be made to FIG. 3 for the structure of a display substrate provided by Embodiment Two of the disclosure. Unlike Embodiment One, at the position of the primary spacer A, the border L21 in the column direction of the color filter 220 does not have a protrusion and a recess, namely, it does not have a bending part, while at the position of the auxiliary spacer A', the border L32 in the column direction of the color filter 230 does not have a bending part, either. The sectional view at C-C' of the display substrate provided by Embodiment Two is analogous to FIG. 2, and will not be described in detail here. At this time, two adjacent color filters do not overlap at the position of the bending part.

In the display substrate provided by Embodiment Two, it is also flat at the position where the spacer is arranged, which may cause the spacer to be arranged stably. For other structures, reference may be made to the description about Embodiment One, and they will not be described again here.

Embodiment Three

Figure 4:
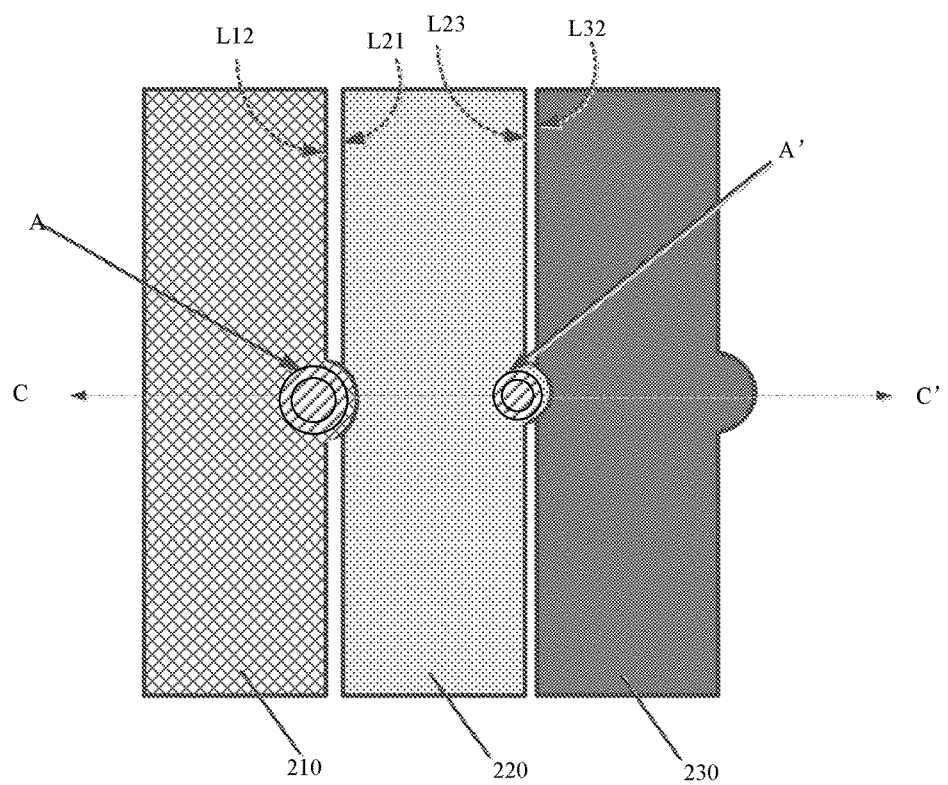
FIG. 4 is a schematic longitudinal section view of a display substrate provided by Embodiment Three of the disclosure.
Figure 5:
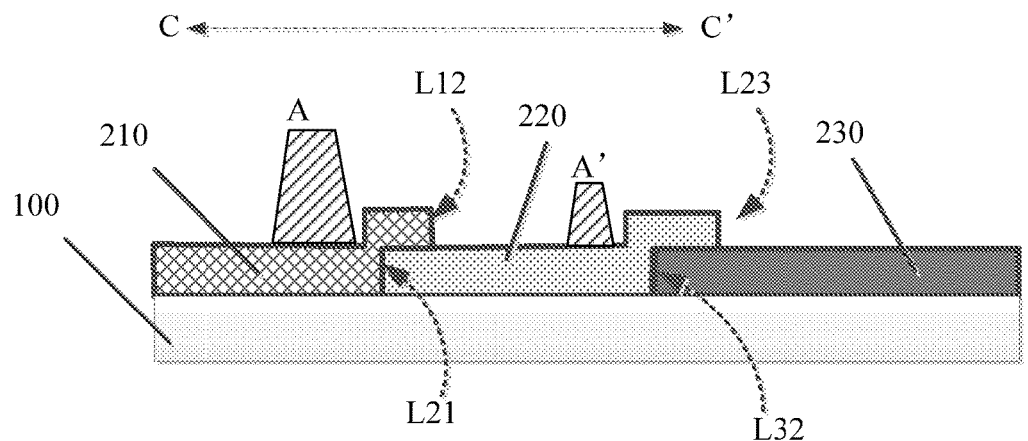
FIG. 5 is a schematic top view of the display substrate provided by Embodiment Three of the disclosure.

Reference may be made to FIG. 4 and FIG. 5 for the structure of a display substrate provided by Embodiment Three of the disclosure. Unlike Embodiment Two, at the position of the primary spacer A, part of the protrusion of the color filter 210 is stacked above the color filter 220, and at the position of the auxiliary spacer A', part of the protrusion of the color filter 220 is stacked above the color filter 230 (in FIG. 4 and FIG. 5, it is assumed that the color filter 210 is arranged above the color filter 220, and the color filter 220 is arranged above the color filter 230).

In the display substrate provided by Embodiment Three, it is also flat at the position where the spacer is arranged, which may cause the spacer to be arranged stably. For other structures of the display substrate provided by Embodiment Three, reference may be made to the description about Embodiment Two, and they will not be described again here.

Embodiment Four

Figure 6:
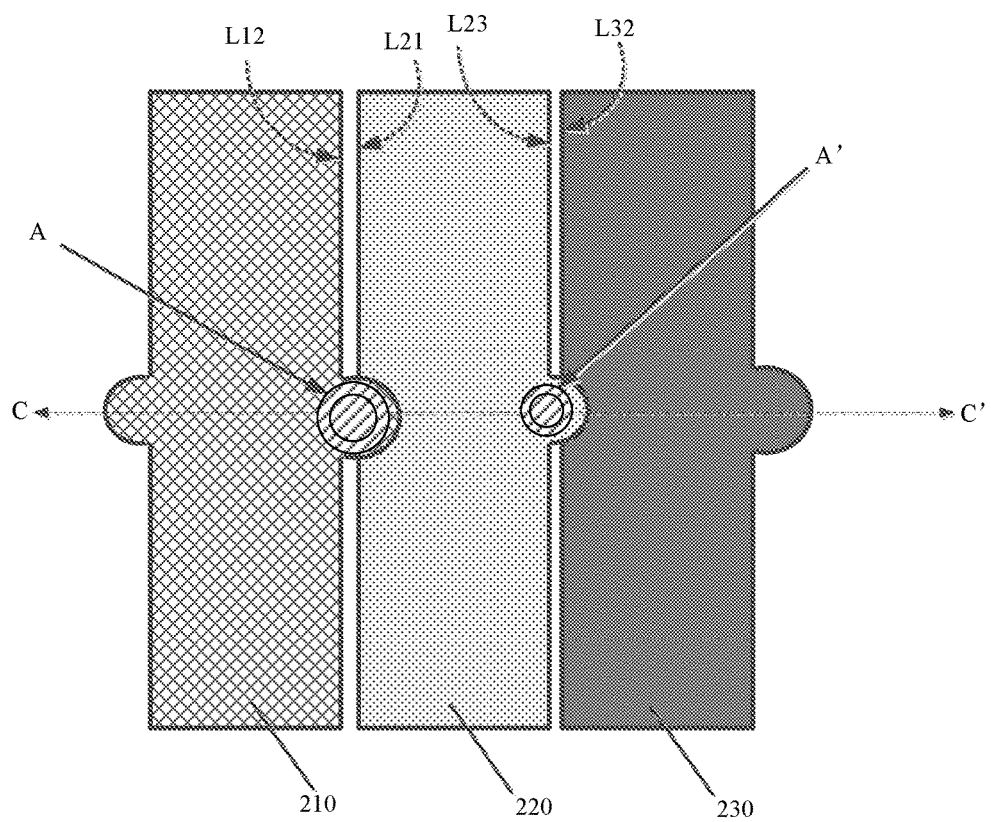
FIG. 6 is a schematic longitudinal section view of a display substrate provided by Embodiment Four of the disclosure.
Figure 7:
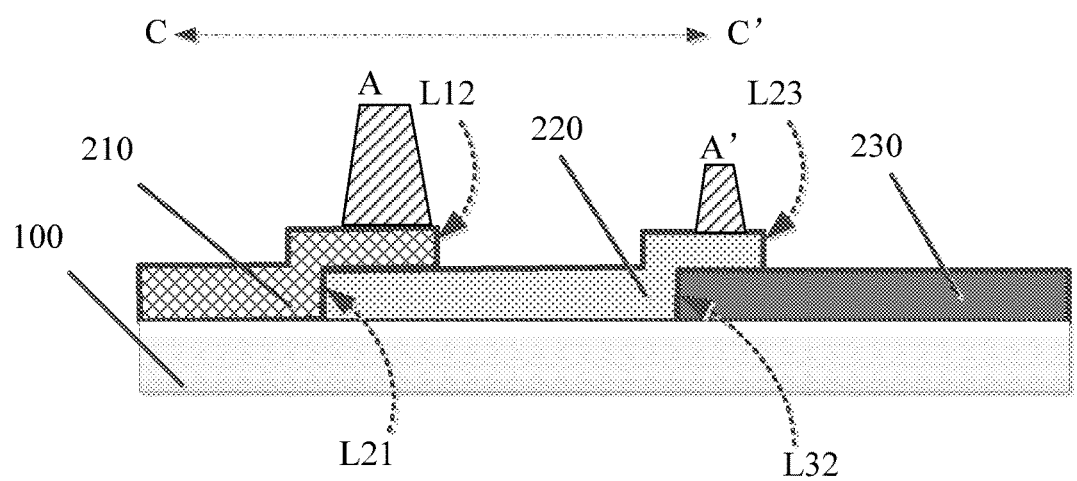
FIG. 7 is a schematic top view of the display substrate provided by Embodiment Four of the disclosure.

Reference may be made to FIG. 6 and FIG. 7 for the structure of a display substrate provided by Embodiment Four of the disclosure. Unlike Embodiment One, at the position of the primary spacer A, the color filter 220 also has a protrusion toward the left side, such that the color filter 220 has a bending part at a border in the column direction. At the position of the auxiliary spacer A', the color filter 230 also has a protrusion toward the left side, such that the color filter 230 has a bending part at a border in the column direction. At this point, under the primary spacer A and the auxiliary spacer A', two layers of color filter layer materials overspread a surface of the display substrate facing the spacers (in FIG. 6 and FIG. 7, it is supposed that the color filter 210 is arranged above the color filter 220, and the color filter 220 is arranged above the color filter 230), which may thus also cause the surface of the display substrate facing the spacers to be flat and is conducive to stably arranging the spacers.

In the display substrate provided by Embodiment Four, it is also flat at the position where the spacer is arranged, which may cause the spacer to be arranged stably. For other structures of the display substrate provided by Embodiment Four, reference may be made to the description about Embodiment One, and they will not be described again here.

It is not difficult to see from the above Embodiment One to Four that, when implemented specifically, bending directions of the bending parts in the borders of two adjacent color filters 220 in the column direction may be the same, for example, as shown in FIG. 1 and FIG. 2, both are toward the right side shown in the figures (of course, in a practical application, both may be also toward the left side, unnecessarily according to the manner in FIG. 1 and FIG. 2), and alternatively the bending directions of the bending parts in the borders of two adjacent color filters 220 in the column direction may be opposite to each other.

It is not difficult to understand that, although the above individual embodiments are all described to comprise color filters of three different colors, in a practical application, the number of colors of the color filters comprised in the display substrates described above may also not be 3, for example, may be 4, and at this point, colors of the color filters may be RGBW.

When implemented specifically, in a display substrate described above, the individual spacers may be distributed along data lines in an array substrate corresponding to the display substrate.

When implemented specifically, the display substrate may be arranged according to the following manner: at the position of the same row of pixels, shapes of the borders of the individual color filters in the column direction on a first side are the same; shapes of the borders in the column direction on a second side are also the same; and shapes of the borders of the same column of color filters in the column direction on the first side at the position of an individual row of pixels are the same, and shapes of the borders in the column direction on the second side at the position of an individual row of pixels are also the same. In such a scenario, corresponding to color filters at positions of pixels not for arranging spacers, and corresponding to primary and auxiliary spacers of different shapes and alternatively the same kind of spacers of different shapes, the shapes of the borders of color filters at positions of pixels for arranging spacers are the same, and an advantage of this is that the difficulty in designing a mask in a patterning process may be reduced.

When implemented specifically, the display substrate referred to by the disclosure may particularly refer to a color film substrate, and alternatively also may refer to an array substrate on which color filters are formed. What form is specifically implemented for the above display substrate is not defined by the invention.

It needs to be noted that, when implemented specifically, in the above individual display substrates, other structural layer may be further formed above the color filters, e.g., a common electrode layer, etc., and the spacers may be specifically arranged on a corresponding structural layer, but not directly arranged above the color filters. However, in general, the thickness of the common electrode layer is relatively little and uniform, which will not have much impact on the shape of the upper surface of the display substrate.

It is not difficult to understand that, in the above individual embodiments, the left side direction and the right side direction may be interchanged. For example, in Embodiment One, it may be such that the left sides of the individual color filters have protrusions, and the right sides have recesses; and in Embodiment Two, it may be such that the left sides of the individual color filters have protrusions, and the right sides have no bending parts. The corresponding technical solutions may also achieve the basic object of the embodiments of the present disclosure, and should also fall within the protection scope of the invention.

In a second aspect, the embodiments of the present disclosure further provides a display device comprising a first display substrate, a second display substrate and a liquid crystal layer; the first display substrate and the second display substrate being separated by a spacer, the liquid crystal layer being located between the first display substrate and the second display substrate; wherein the first display substrate is a display substrate as described in any of the above embodiments.

When implemented specifically, the display device herein may be any product and alternatively component with the display function, such as electronic paper, a mobile phone, a tablet computer, a TV set, a display, a notebook computer, a digital photo frame, a navigator, etc.

What are described above are just preferred embodiments of the present disclosure. It should be noted that, for those of ordinary skills in the art, several improvements and modifications may be further made without departing from the technical principles of the present disclosure, and these improvements and modifications should also be construed as in the protection scope of the present disclosure.

The invention claimed is:

1. A display substrate, comprising a base, a plurality of color filters formed on the base, and a plurality of spacers formed on the base;
   wherein two of the plurality of color filters are positioned adjacent to one another;
   at least one of the two adjacent color filters having a bending part located at a position corresponding to at least one of the plurality of spacers and at an adjacent border close to the other of the two adjacent color filters; wherein the bending part is a protrusion adapted to cause at least one of the plurality of spacers to be located inside an adjacent border of the other of the two adjacent color filters, and projection of the bottom surface of the spacer on the side close to the base on the base does not overlap projection of any of the adjacent borders of the two adjacent color filters on the base;
   wherein a first color filter in the two adjacent color filters has the bending part at an adjacent border close to a second color filter, and the bending part is the protrusion; the second color filter does not have a bending part at an adjacent border close to the first color filter; and the first color filter is any one of the two adjacent color filters, and the second color filter is the other one of the two adjacent color filters.

2. The display substrate of claim 1, wherein at least one of the plurality of spacers is at least partially located inside the bending part which is the protrusion.

3. The display substrate of claim 1, wherein the two adjacent color filters overlap at a position of the bending part, and projection of the bottom surface of the spacer on the side close to the base on the base is outside a border of the projection of overlapping part of the two adjacent color filters on the base.

4. The display substrate of claim 1, wherein the two adjacent color filters do not overlap at a position of the bending part.

5. The display substrate of claim 1, wherein the outline of the bending part is an arc, a polyline, or a combination of an arc and a polyline.

6. The display substrate of claim 1, wherein one part of the plurality of spacers is located on the protrusion, and the other part is located on body part of a color filter which the protrusion belongs to.

7. The display substrate of claim 1, wherein the spacer is a primary spacer or an, auxiliary spacer, and a shape of an outline of the bending, part is the same as that of an outline of a surface of the spacer facing a color filter at a position of the bending part.

8. The display substrate of claim 1, wherein at a position of the same row of pixels, shapes of borders of the individual color filters on a first side are the same; and shapes of borders on a second side are also the same;
   shapes of borders of the same column of the color filters on the first side at a position of individual rows of pixels are the same, and shapes of borders on the second side at a position of individual rows of pixels are the same.

9. A display device comprising the display substrate of claim 1.

10. A display device comprising the display substrate of claim 2.

11. A display device comprising the display substrate of claim 3.

12. A display device comprising the display substrate of claim 4.

13. A display device comprising the display substrate of claim 5.

14. A display device comprising the display substrate of claim 6.

* * * * *